United States Patent [19]

Eby

[11] Patent Number: 5,101,938
[45] Date of Patent: Apr. 7, 1992

[54] MECHANICAL LOAD BRAKE WITH AUTOMATIC ADJUSTMENT

[75] Inventor: John C. Eby, Springfield, Ohio

[73] Assignee: R&M Materials Handling, Inc., Springfield, Ohio

[21] Appl. No.: 595,195

[22] Filed: Oct. 10, 1990

[51] Int. Cl.$^5$ .................. B60T 8/72; F16D 65/62
[52] U.S. Cl. .................. 188/71.8; 188/82.1; 188/180; 188/196 F
[58] Field of Search ............... 188/195, 196 R, 196 F, 188/71.9, 71.8, 71.7, 82.1, 82.3, 82.34, 82.74, 82.77, 196 P, 77 W, 180; 192/111 A, 54; 254/375, 376

[56] References Cited

U.S. PATENT DOCUMENTS

| 844,808 | 2/1907 | Kendall | 188/82.1 X |
|---|---|---|---|
| 972,451 | 10/1910 | Israel | 188/82.1 X |
| 2,463,344 | 3/1949 | Williams | 188/82.3 |
| 2,875,857 | 3/1959 | Chapin | 188/71.9 X |
| 2,878,901 | 3/1959 | Runner | 188/71.8 |
| 2,886,140 | 5/1959 | Trevaskis | 188/71.8 |
| 2,900,052 | 8/1959 | Frayer et al. | 188/71.8 |
| 2,984,319 | 5/1961 | Butler | 188/196 P X |
| 3,095,064 | 6/1963 | Tankersle et al. | 188/71.8 |
| 3,155,195 | 11/1964 | Brawerman | 188/71.9 |
| 3,158,234 | 11/1964 | Henderson | 188/71.86 X |
| 3,297,115 | 1/1967 | Walden et al. | 188/71.7 X |
| 3,405,791 | 10/1968 | Kaplan | 188/77 W X |
| 3,433,332 | 3/1969 | Braun | 188/71.8 X |
| 3,439,781 | 4/1969 | Ostwald | 188/196 P |
| 3,542,165 | 11/1970 | Lucien | 188/71.8 X |
| 3,554,336 | 1/1971 | Crossman | 188/196 R |
| 3,752,286 | 8/1973 | Sink | 188/196 F X |
| 3,835,961 | 9/1974 | Troester et al. | 188/71.9 |
| 4,142,610 | 3/1979 | Alexander et al. | 188/171 X |
| 4,156,521 | 5/1979 | Harman | 254/375 |

FOREIGN PATENT DOCUMENTS 1032250  7/1983  U.S.S.R. ............... 188/71.7

Primary Examiner—Robert J. Oberleitner
Assistant Examiner—Peter M. Poon
Attorney, Agent, or Firm—Porter, Wright, Morris & Arthur

[57] ABSTRACT

In a mechanical load brake for a hoist or other lifting device, a one-way device such as a helical wrap spring is fitted over the load brake shaft to automatically adjust for brake disc wear. A tang on the one-way device engages a drive hole in an input gear of the mechanical load brake. The diameter of the drive hole is selected so that the clearance of the tang in the drive hole corresponds to the optimal operating range. The one-way device moves around the shaft as the discs wear maintaining the optimal adjustment for the brake.

8 Claims, 3 Drawing Sheets

MECHANICAL LOAD BRAKE WITH AUTOMATIC ADJUSTMENT

BACKGROUND AND SUMMARY OF THE INVENTION

This invention relates to mechanical load brakes, and more particularly to a self-adjusting mechanism for a load brake, to compensate for wear of surfaces of the brake due to friction.

A mechanical load brake as commonly used in a hoist or other lifting device, dissipates the potential energy due to lowering the load by converting the kinetic energy produced by lowering the load into heat, through friction. The friction causes wear of the brake friction surfaces. Adjustments to the brake to compensate for the surface wear are normally required to provide proper operation and long life of the brake. Means to permit the renewal of the friction surfaces without extensive dismantling of the braking system are desirable. Wear of the friction surfaces should be compensated if undue movement of the brake-actuating mechanism is to be avoided as the wear increases. The subject invention provides automatic adjusting means which are particularly adapted for this purpose.

Previous load brakes required manual adjustment. In previous devices, as the friction discs wear, an operating gap (for example, in some devices the distance between a driving lug with the brake clamp shut and a control pin) must be reduced by rotating the drive lug closer to the control pin. This adjustment, or similar adjustments in other devices, requires manual intervention which takes time, and the device cannot be used while the adjustment is being made. Furthermore, unless the operator was attentive to the need for adjustment, the brake reliability may become dangerously low.

The present invention provides a device which allows a brake to adjust automatically without downtime. The present invention maintains an optimal operating gap without the need for the operator to constantly check the brake surface wear.

One preferred embodiment of the present invention uses a one-way wrap spring which snugly fits on the load brake shaft. A tang of the wrap spring engages a drive hole in the input gear of the brake. The direction of the helix of the wrap spring is such that when the input shaft is turned in the "up" direction, the spring loosens its grip on the shaft. This permits the input gear to close as far as necessary to close the brake for "up" operation. In the "down" direction, the input gear turns on the shaft until the side of the drive hole strikes the wrap spring tang. This tightens the spring on the shaft and forces the shaft to turn with the input gear. The diameter of the drive hole is selected so the clearance of the tang within the drive hole corresponds to the optimal operating range. The wrap spring moves around the shaft as the discs wear maintaining the optimal adjustment for the brake. In addition to a helical wrap spring, other one-way devices may be adapted for use in the present invention.

The foregoing invention will become more apparent when viewed in light of the accompanying drawings and the following description wherein:

DESCRIPTION OF A PREFERRED EMBODIMENT(S)

Figure 3:
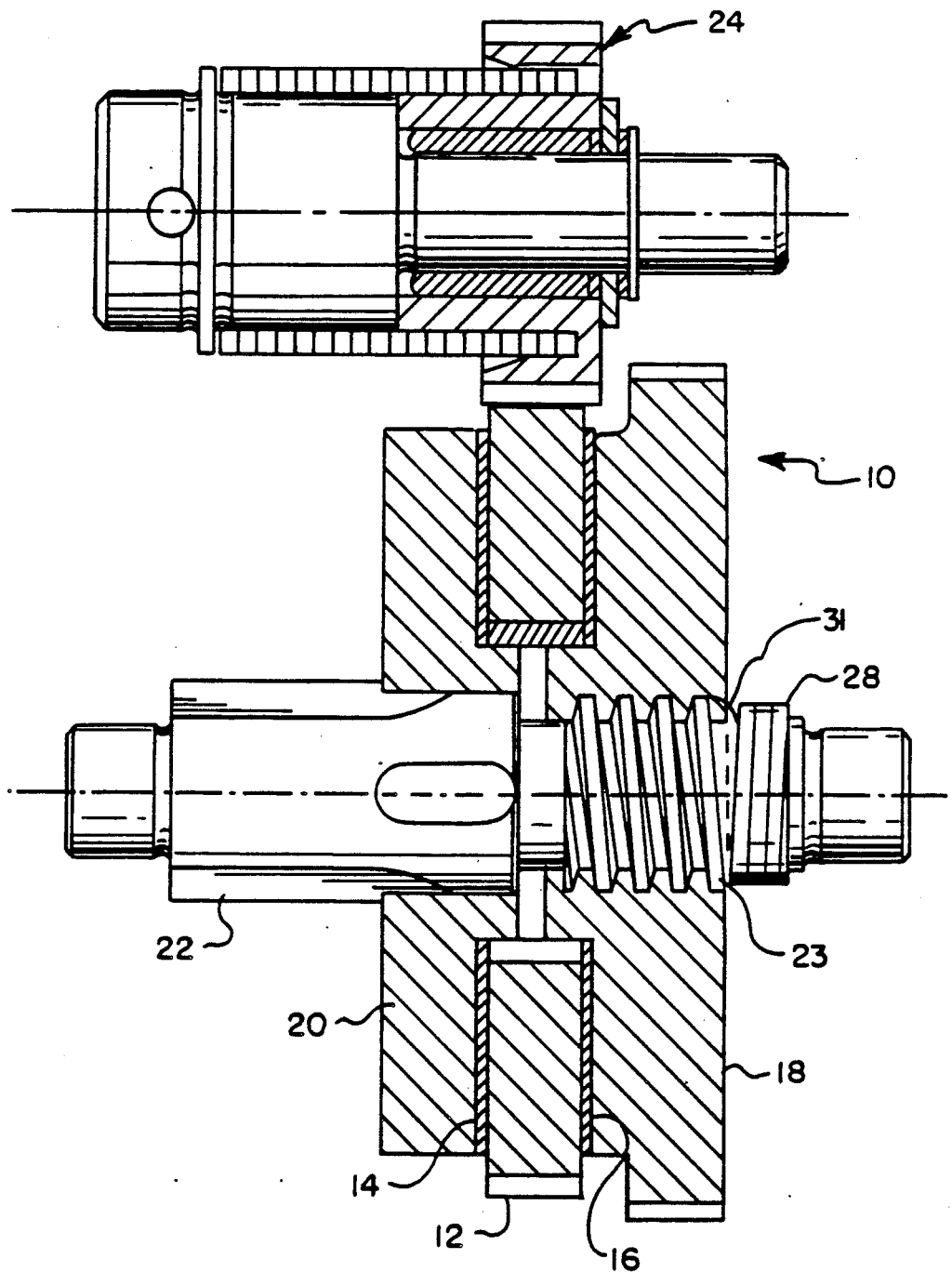
FIG. 3 is an enlarged sectional view taken along lines 3—3 of FIG. 2.

Referring now to the drawings, there is illustrated a mechanical load brake mechanism generally indicated at 10 and of a type known to be used in hoists or other lifting devices. As shown in FIG. 3 a geared friction wheel 12 and two friction discs 14, 16 are situated between a brake input gear 18 and an output thrust disc 20. The output thrust disc 20 is keyed to and rotates with a load brake pinion shaft 22. The load brake pinion shaft 22 has a threaded portion 23 to be engaged with the threaded brake input gear 18.

The friction wheel 12 can turn in the direction of rotation required for the lifting motion of a hoist. It is prevented from turning in the direction corresponding to a lowering motion by a one-way pinion mechanism 24. When the brake input gear 18 is stationary, any load the hoist is supporting acts to turn the load brake shaft 22 in the direction which moves the thrust disc 20 toward the input gear 18. This clamps the friction wheel 12 and friction discs 14, 16 between the thrust disc 20 and the input gear 18. The load brake shaft 22 is prevented from continued turning once the friction forces between it and the adjacent friction discs 14, 16 are great enough to prevent relative motion since the friction wheel 12 and friction discs 14, 16 are prevented from turning in the lowering direction by the one-way pinion mechanism 24.

In the hoisting direction, the input gear 18 turns on the threaded load brake pinion shaft 22 in the direction which moves it toward the thrust disc 20. This clamps the friction wheel 12 and friction discs 14, 16 between the input gear 18 and the thrust disc 20. All elements on the load brake shaft 22 then rotate together due to the friction wheel 12 being free to turn in the "up" direction.

In the lowering direction, the input gear 18 turns in the direction to reduce the clamping pressure on the friction wheel 12 and friction discs 14, 16. When the friction forces between the thrust disc 20 and the adjacent friction disc 14 are lowered sufficiently, a slipping action occurs and the load brake shaft 22 can be turned in the "down" direction by the load. If the load brake shaft 22 begins to rotate faster than the input gear 18, the clamping pressure is increased. The additional friction reduces the rotational speed of the shaft 22 to that of the input gear 18.

Figure 1:
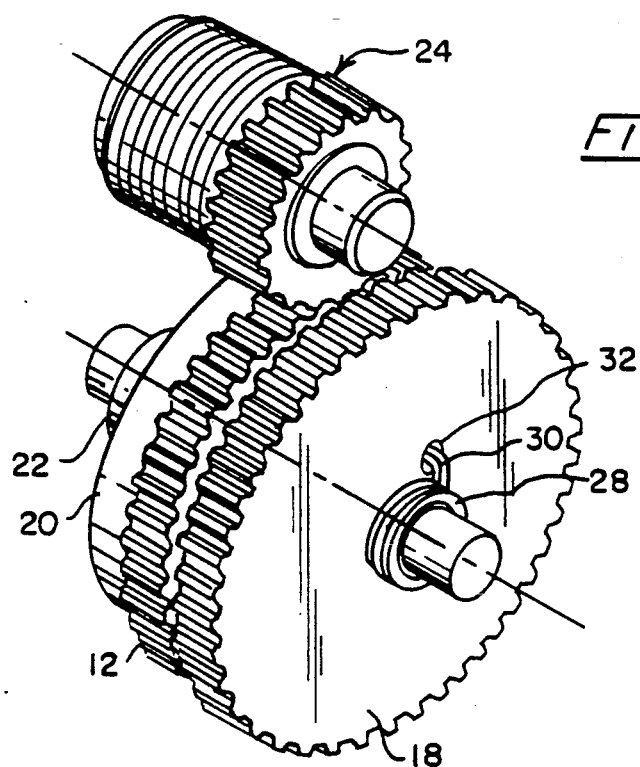
FIG. 1 is a perspective view of a geared friction wheel and one-way pinion mechanism of a mechanical load brake.
Figure 2:
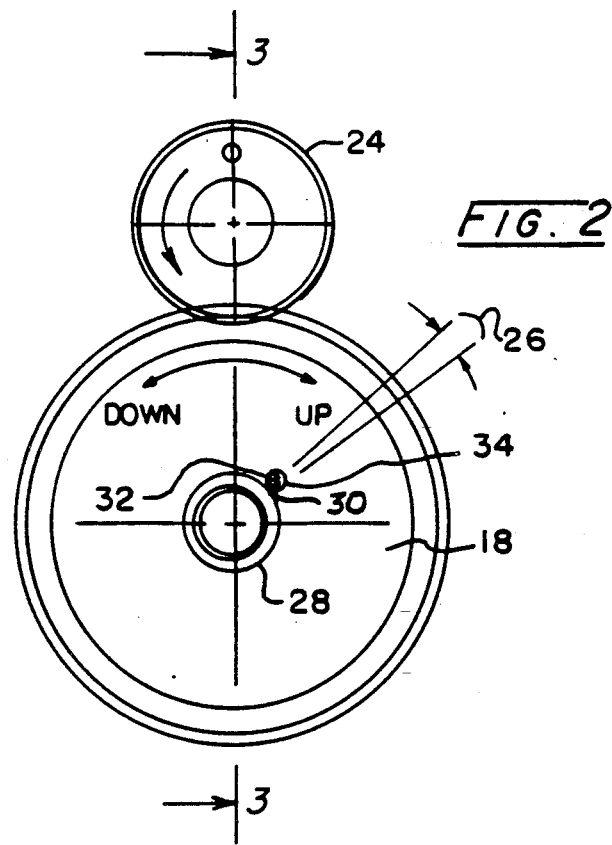
FIG. 2 is a front elevational view of the mechanism of FIG. 1.

A self-adjusting feature is placed on the mechanism 10 to maintain an operating gap 26 at an optimum setting as shown in FIG. 2. A one-way device 28 is used to compensate for any increase in the operating gap 26 above a design setting. One particular one-way device 28 shown in FIG. 1 is a one-way helical wrap spring. The spring 28 is snuggly fitted on the load brake shaft 22. A tang 30 on an end 31 of the spring 28 may form the means for engaging a drive hole 32 in the input gear 18. The tang 30 may be an extension of the helix of the spring 28 that leaves the helical twist and goes tangent thereto before turning normal with respect to the tangent. The normal segment is engaged within the drive hole 32.

Figure 5:
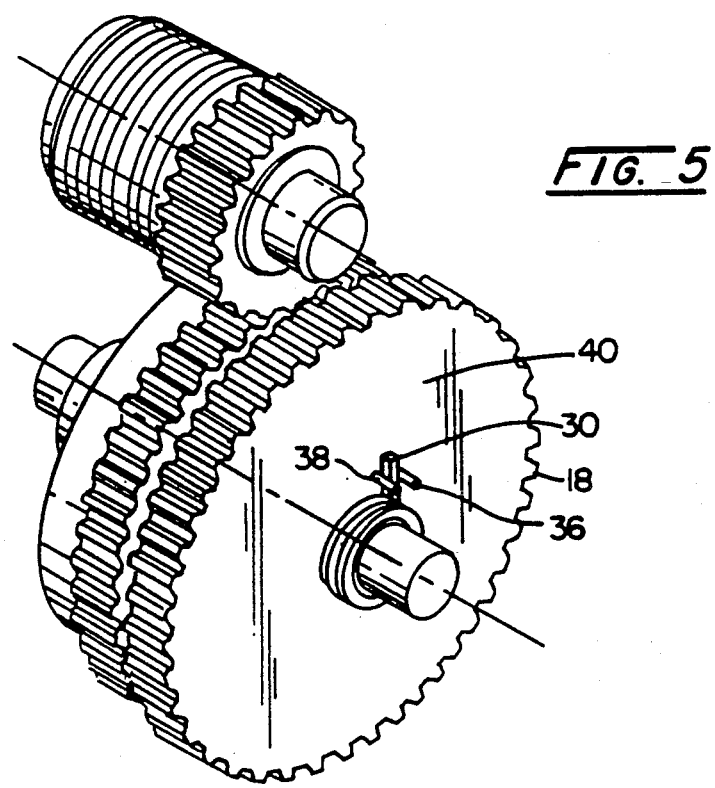
FIG. 5 is a perspective view of a geared friction wheel having yet another embodiment of the present invention.

Other embodiments of the spring 28 with tang 30 may be incorporated into the invention. For example, as shown in FIG. 5, the tang 30 may not have a normal segment but would end as a tangent to the helix. In this embodiment the input gear 18 would not have need for a drive hole 32, but instead would have protusions 36, 38 extending from the face 40 of the input gear 18, between which the tangent end of the tang 30 would reside. The clearance of the tang 30 between the protrusions 36, 38 would correspond to the optimal operating range of the brake 10.

Figure 4:
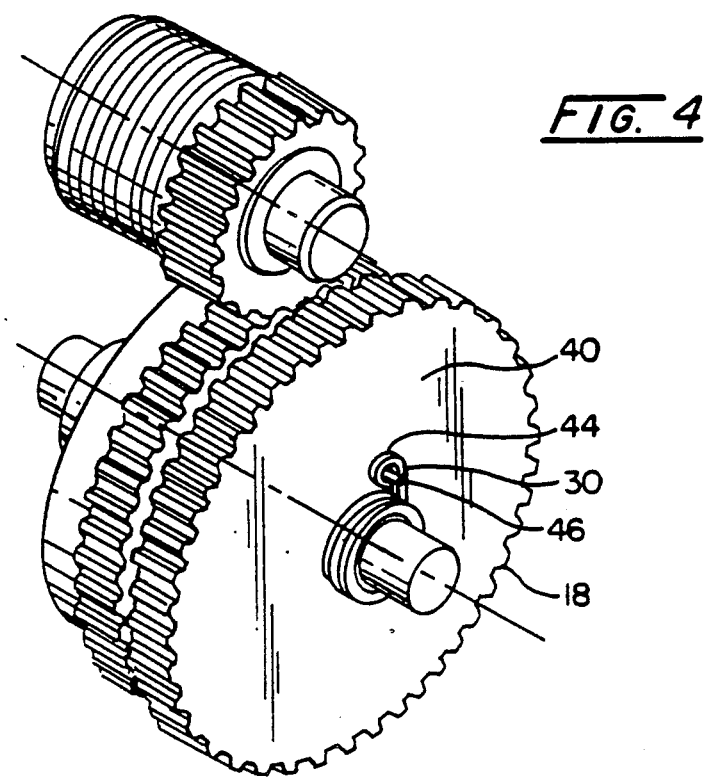
FIG. 4 is a perspective view of a geared friction wheel having another embodiment of the present invention.

In yet another embodiment, as shown in FIG. 4, the tang 30 tangent segment may have a loop 44 formed therein. A pin 46 protruding from the face 40 of the input gear 18 would reside inside the loop 44 of the tang 30. The size of the loop 44 would correspond to the optimal operating range of the brake 10.

The direction of the helix 28 is such that when the input gear 18 is turned in the "up" direction, the spring 28 loosens its grip on the shaft 22. This permits the input gear 18 to close as far as necessary to close the brake 10 for "up" operation. In the "down" direction, the input gear 18 turns on the shaft 22 until the side 34 of the drive hole 32 strikes the wrap spring tang 30. This tightens the spring 28 on the shaft 22 and forces the shaft 22 to turn with the input gear 18. The diameter of the drive hole 32 is selected so that the clearance of the tang 30 and the drive hole 32 corresponds to the optimal operating range. The adjustment spring 28 moves around the shaft 22 as the discs 14, 16 wear, maintaining the optimal adjustment for the brake 10.

Other one-way mechanisms would serve the intended purpose of the spring 28 in an appropriate application. For example, ratchet mechanisms can function in one direction. Sprague clutches also function in one direction. Either of these devices could replace the spring 28 in an appropriate application. The operating gap would still have to be considered when using these devices.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

What is claimed is:

1. An automatic adjustment feature to compensate for brake disc wear on a mechanical load brake, said feature comprising at least one brake disc;
    a one-way device to be fitted on a shaft of said load brake; and
    means forming a part of said one-way device to be engaged directly with an input gear of said load brake such that when said shaft is turned in the "up" direction, said one-way device loosens its grip on said shaft permitting said input gear to close to an extent necessary to close said brake for "up" operation and such that in the "down" direction, said one-way device tightens its grip on said shaft and forces said shaft to turn with said input gear.

2. The load brake feature of claim 1, wherein said one-way device moves around said shaft as said disc wears maintaining an optimal adjustment for said brake.

3. The load brake feature of claim 1, wherein said one-way device is a helical wrap spring.

4. The load brake feature of claim 3, wherein said means forming a part of said one-way device is a tang forming an end of said spring.

5. The load brake feature of claim 4, wherein said tang engages a drive hole in a face of said input gear and the clearance of said tang within said drive hole corresponds to an optimal operating range.

6. The load brake feature of claim 4, wherein said tang has a loop formed therein that fits over a pin, said pin secured to a face of said input gear.

7. The load brake feature of claim 4, wherein said tang engages two protrusions from a face of said input gear.

8. An automatic adjustment feature to compensate for brake disc wear on a mechanical load brake mechanism, said feature comprising:
    a helical wrap spring fitted snugly around a shaft of said load brake;
    a tang on an end of said spring to be engaged within a drive hole in direct engagement with an input gear of said load brake mechanism; and
    said drive hole having clearance around said tang corresponding to an optimal operating range for said mechanism.

* * * * *